Figure 1:
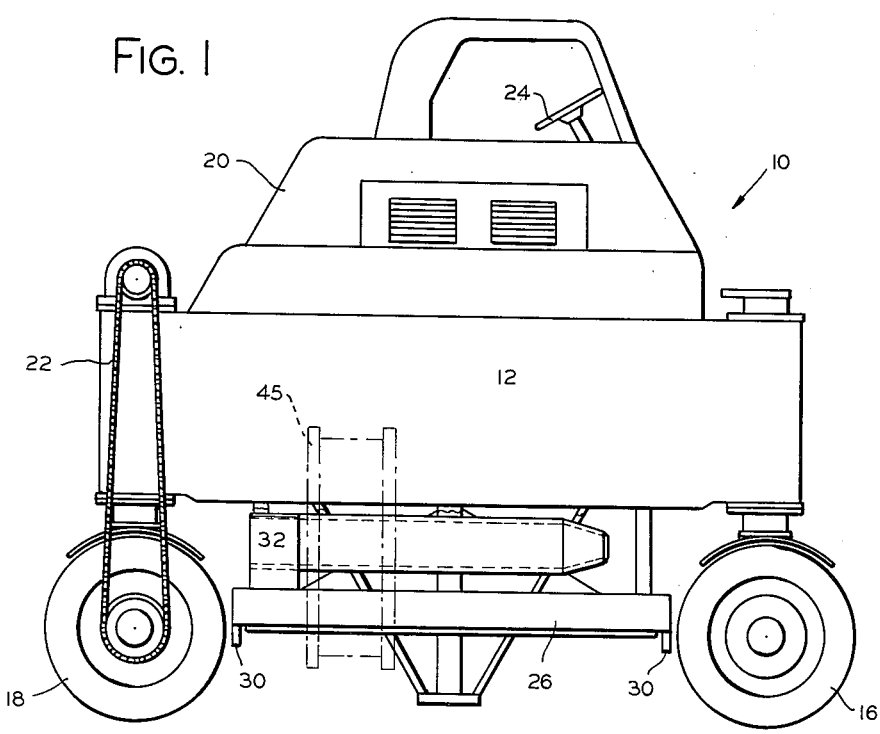

March 21, 1961   R. A. DODGE   2,975,922
LOAD HANDLING DEVICE FOR STRADDLE CARRIERS
Filed March 24, 1955   2 Sheets-Sheet 1

INVENTOR.
RAYMOND A. DODGE
BY
ATTY.

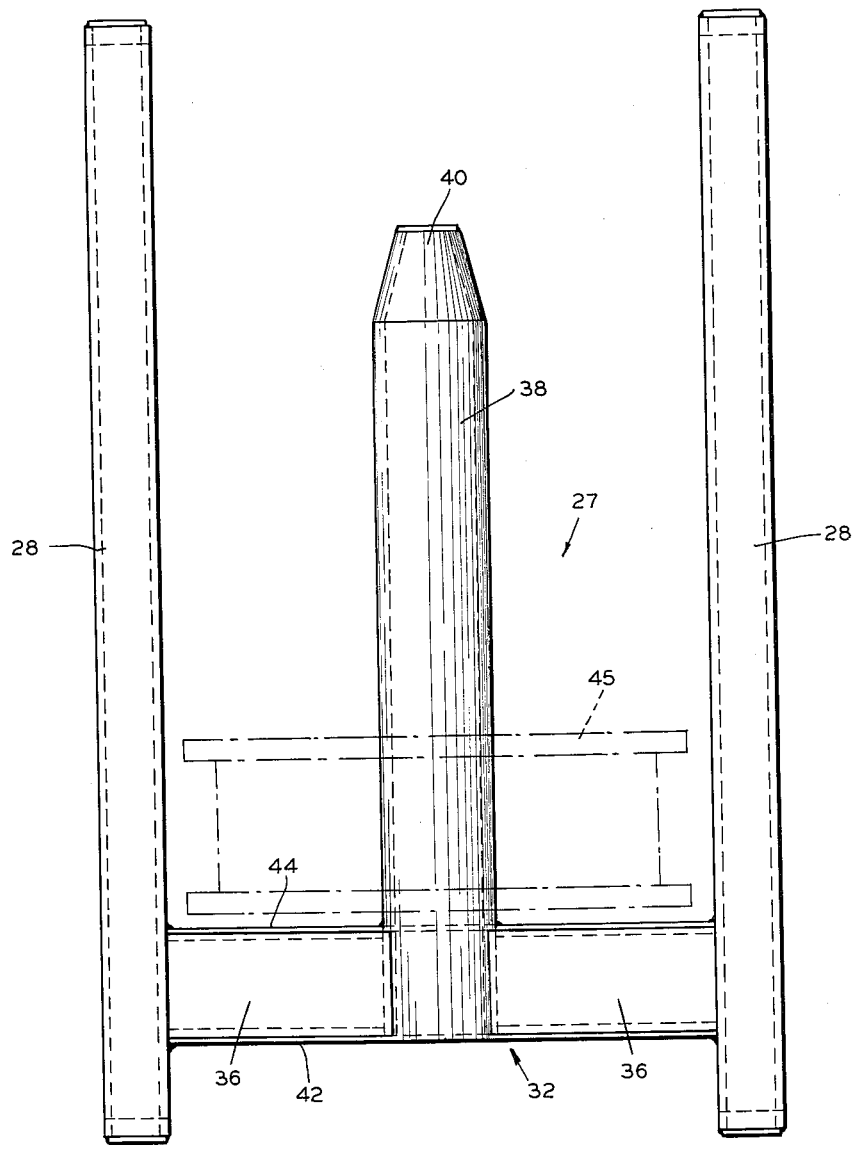

United States Patent Office 2,975,922
Patented Mar. 21, 1961

2,975,922

LOAD HANDLING DEVICE FOR STRADDLE CARRIERS

Raymond A. Dodge, Niles, Mich., assignor to Clark Equipment Company, a corporation of Michigan Filed Mar. 24, 1955, Ser. No. 496,363

2 Claims. (Cl. 214—394)

This invention relates to load handling devices for straddle carriers or gantry trucks as they are sometimes called.

The object of this invention is to provide a load handling device for a straddle carrier which will facilitate the handling of coils of metal in strip form, coils of wire and the like.

Straddle carriers have been in use for a considerable period in the lumber industry, the metal industry and elsewhere. The conventional arrangement for handling material with such machines is to load the material to be transported on a bolster. Such a bolster may consist of a rectangular frame or platform of wood or steel, which is arranged to support the material to be carried above it, and to be picked up by being engaged by the load hooks of the straddle carrier beneath and along the two longer sides of the rectangular frame.

Straddle carriers are provided with depending load hooks along the two sides of the machine just inside the wheels. These hooks are arranged for small lateral movement so that they may be moved apart to provide clearance as the carrier is driven over the bolster. After the carrier is in position over the bolster the hooks are moved inwardly beneath the bolster. Then the hooks may be raised vertically a sufficient amount to raise the bolster with its load off of the ground and allow the bolster and load to be transported to another location where they are set down again.

Heretofore, coils of metal strip and wire have been handled on bolsters in the same manner as other materials. The handling of such coils with a straddle carrier in this manner is generally much more convenient and less costly than other methods of handling coils; however, if conventional bolsters are used it is necessary to load the coils onto the bolster before the straddle carrier can pick them up. Similarly, it is necessary to unload them from the bolster again at the end of the trip by the straddle carrier.

I have conceived of a load handling device for straddle carriers which makes it unnecessary to load the coils onto a bolster and then unload them again.

In carrying out my invention in one form I provide a load handling device which includes a pair of stringer members located in parallel spaced apart relation and adapted to be engaged respectively by the load hooks of a straddle carrier. Brace means interconnect the stringer members at the one end thereof, and a ram member is connected to the brace means and extends centrally between the stringer members and parallel thereto.

In operation, this load handling device is carried by the straddle carrier. The coils which the carrier is to pick up are arranged with the holes in the coils located coaxially so that the ram portion of the load handling device can enter the openings of all of the coils when the straddle carrier is driven over the coils with the load handling device at the proper height. After the carrier has been driven over the coils in this manner and the ram portion of the load handling device is within the openings of the coils, the load hooks are elevated to raise the coils, after which they may be transported by the straddle carrier. At the straddle carrier's destination, the coils are deposited again in the reverse manner by lowering the load hooks so that the ram disengages the coils and then backing the straddle carrier away from the coils.

For a clearer and more complete understanding of my invention, reference should be had to the accompanying drawing in which—

Figure 2:
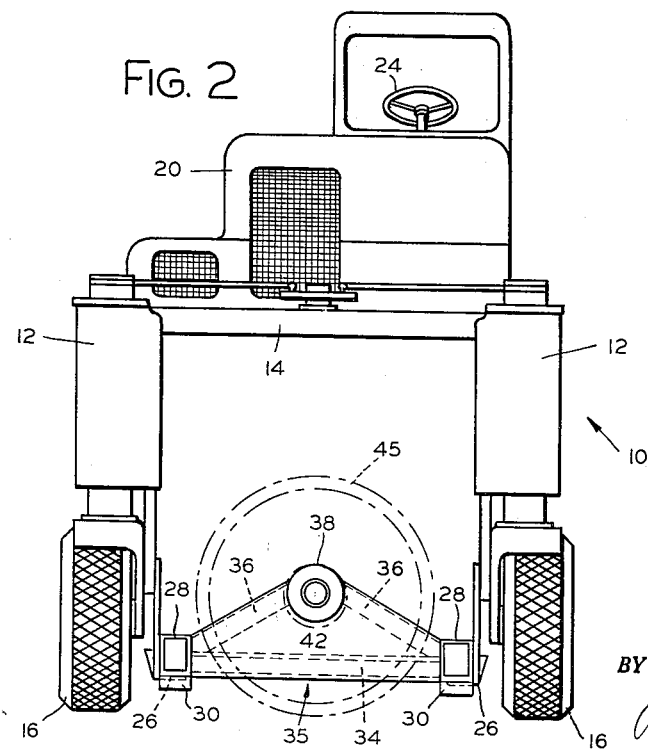

Figure 1 is a side elevation view of a straddle carrier carrying a load handling device of my invention, Figure 2 is a front elevation view of the machine of Figure 1, and Figure 3 is a top plan view of the load handling device only of Figures 1 and 2.

Referring to Figures 1 and 2 of the drawing, the numeral 10 indicates generally a straddle carrier or gantry truck of the type with which my load handling device may be used advantageously. The carrier 10 includes a pair of side frame portions 12 which are interconnected by an overhead top portion 14 to form the gantry structure. The machine 10 includes a pair of front dirigible wheels 16 and a pair of rear dirigible drive wheels 18 (only one of which appears in the drawing). The machine is propelled by an internal combustion engine or other suitable prime mover which may be located in the compartment 20. The prime mover actuates the rear drive wheels by means of a chain drive mechanism indicated at 22 or other equivalent drive means. The front and rear dirigible wheels 16 are connected to and operated by a suitable operator's steering wheel 24 which is located in an operator's compartment at the top of the vehicle.

The machine 10 includes a pair of lift or load hooks 26 which depend just inside the wheels adjacent the sides of the vehicle. These load hooks are arranged to be moved laterally in and out a small amount. They are also arranged to be raised and lowered. Figure 1 shows the hooks in a raised position, while they are shown in the lowered position in Figure 2. The hooks may be operated hydraulically both for their lateral movements and their vertical movements, or they may be operated by mechanical or other equivalent means if desired. The power for operating the hooks ordinarily is derived from the same prime mover which propels the vehicle 10.

The load handling device of my invention is shown in position on the straddle carrier in Figures 1 and 2 and removed from the carrier in Figure 3 and is designated generally by the numeral 27. The device 27 includes a pair of stringer members 28 which are arranged in parallel relation and are located so that they may be engaged by the load hooks 26. The stringer members 28 are provided with downwardly projecting portions 30 at the both ends. These projections aid in maintaining the load handling device 27 on the load hooks because they prevent the device 27 from shifting longitudinally. Also, the projections 30 rest on the ground or other supporting surface and maintain the stringer members 28 above such surface so that the load hooks 26 may enter beneath the stringer members to enable the carrier to pick up the load handling device.

The device 27 further includes a transverse brace portion 32 which is connected between the stringer members 28 adjacent one end of the load handling device. As illustrated, the brace portion 32 includes a horizontal channel member 34 which serves as a cross tie between the two stringer members and a pair of shorter channel members 36 which are connected at their lower ends to the stringer members and to the cross tie 34 and extend upwardly to form a pyramidal structure. At the apex of the pyramid a longitudinally extending ram member 38 is connected. The ram 38 as illustrated is a hollow steel tube which extends longitudinally forwardly from the brace portion 32 midway between the stringer members 28 and in parallel relation with the stringer members. The ram 38 has a tapered portion 40 at the forward end to facilitate the entry of the ram into coils of metal strip and wire and the like.

The brace portion 32 in this typical form of the invention is completed by two steel plates 42 and 44 which are positioned in abutting relation rearwardly and forwardly respectively of the brace members 34 and 36. Preferably the brace members 34, 36, 42 and 44 are welded solidly together and to stringer members 28 and to ram 38 to form a solid unitary structure.

I have shown in phantom in the figures of the drawing how a single spool of wire 45 may be handled with my load handling device. In Figure 1 the spool is shown as it is being carried by the straddle carrier. In Figure 2 the spool is on the ground in position to be picked up by the carrier, or this could be the position just as it is being deposited on the ground by the carrier. Figure 3 shows the location of the spool of wire in a top view. It is believed that it will be clear from the foregoing description of the drawing and the preceding explanation how a carrier which is equipped with this load handling attachment picks up coils of metal or wire, transports them, and deposits them again at the destination, all without the assistance of a helper on the ground. The operator in the straddle carrier performs all operations in picking up, transporting and depositing the coils again.

It will be readily understood, of course, that more than one coil of the metal strip or wire may be carried with this device. A single spool of wire is shown in the drawing merely for purposes of illustration.

While I have illustrated and described herein a load handling device which is detachable from the vehicle which carries it, it will be understood that the load handling device may be incorporated as a part of the vehicle if desired. Ordinarily, however, the detachable version is preferable because the straddle carrier or other vehicle then may be used for handling conventional bolsters or other load handling devices also, without change.

Also, while I have illustrated and described herein a straddle carrier or gantry truck, it will be understood that my invention is not limited to use with vehicles of this type but may be used with other equivalent vehicles if desired. Thus it will be understood that modifications of my invention may be made, and that I intend to cover by the appended claims all such modifications which fall within the true spirit and scope of my invention.

What I claim as new and desire to secure by Letters Patent of the United States is:

1. In combination with a straddle carrier, a pair of longitudinally extending load hooks connected to the straddle carrier and located in parallel relation adjacent opposite sides of the carrier and arranged to be raised and lowered in order to raise material from the ground to a carrying position beneath the carrier, a load handling device comprising a pair of stringer members located in parallel spaced apart relation and adapted to be engaged by said load hooks, a spacer and bracing member rigidly connected to said stringer members adjacent one end only thereof for providing an open U-shaped pocket formed between said stringer members and said bracing member, a pair of load support members extending upwardly from said stringer members in converging relation and connected to said stringer members adjacent the said one end thereof to form with said spacer and bracing member a triangular brace structure, and a cantilever ram member rigidly secured adjacent the apex of the said brace structure and extending centrally between and above the said stringer members and parallel thereto, whereby the straddle carrier may be operated to pick up an annular load in the space between the stringer members by moving the carrier with the load handling device located upon the load hooks longitudinally to insert the said ram member into the opening of the annular load and raising the load hooks.

2. A load handling device as claimed in claim 1 wherein said ram member is adapted to support an annular load in the space between and in the horizontal plane of said stringer members, and support legs projecting downwardly from each of said stringer members for supporting said stringer members at a predetermined elevation prior to engagement thereof by the load hooks.

References Cited in the file of this patent

UNITED STATES PATENTS

| | | |
|---|---|---|
| 1,626,555 | Remde | Apr. 26, 1927 |
| 1,868,562 | Chubb et al. | July 26, 1932 |
| 2,316,938 | Dimick | Apr. 20, 1943 |
| 2,558,535 | Billings | June 26, 1951 |
| 2,601,960 | Hick | July 1, 1952 |
| 2,603,369 | Soderstrom | July 15, 1952 |
| 2,623,775 | Gamet et al. | Dec. 30, 1952 |
| 2,675,934 | Kennedy | Apr. 20, 1954 |
| 2,690,269 | Bill | Sept. 28, 1954 |
| 2,758,734 | Westling | Aug. 14, 1956 |

FOREIGN PATENTS

| | | |
|---|---|---|
| 951,463 | France | Apr. 18, 1949 |